Nov. 17, 1942.    I. JACOBSON    2,302,031

PHOTOGRAPHIC APPARATUS

Filed April 8, 1940

IRVING JACOBSON
INVENTOR

By Harold W. Mattingly
ATTORNEY

Patented Nov. 17, 1942

2,302,031

UNITED STATES PATENT OFFICE 2,302,031

PHOTOGRAPHIC APPARATUS

Irving Jacobson, Los Angeles, Calif., assignor to The Folmer Graflex Corporation, Rochester, N. Y., a corporation of Delaware Application April 8, 1940, Serial No. 328,415

7 Claims. (Cl. 67—31)

My invention relates to photographic apparatus and has particular reference to an attachment device for use in flash lamp photography.

It is common practice to employ photoflash lamps for the taking of photographs, both under conditions wherein there is insufficient light normally present to permit the obtaining of the proper exposure, and also in those conditions wherein it is desired to supplement the natural light with additional light which may be controlled by the photographer as to the direction from whence it comes. The photoflash lamps which are most commonly used for this purpose comprise glass envelopes in which is placed a substance, such as magnesium foil or wire, which is capable of developing a very brilliant and intense light upon ignition. These glass envelopes include also a lamp filament or heater which may be energized from an external source of electric power for the purpose of heating the light producing agent to a sufficiently high temperature to cause ignition thereof. These lamps are available in various physical sizes and in corresponding light producing ratings.

The current practice of employing such flash lamps for photoflash lamp photography is to employ a photoflash lamp unit which includes a suitable source of electric power (usually a pair of small dry batteries), a socket for receiving and holding a photoflash lamp, together with a reflector for that lamp, and a control button by means of which a photographer may fire the photoflash lamp. These devices are usually provided with means for establishing an electrical circuit between the control button and a shutter actuating device which is mounted on the camera so that the camera shutter may be opened for the desired duration of exposure during the time the flash lamp is developing its maximum light brilliancy.

Because of the various physical sizes of lamps which may be used in these flash lamp units, it is necessary that the reflector be adjustably mounted on the unit so as to permit proper alignment of the reflector with the flash lamp. This is ordinarily accomplished by means of a sliding connection cooperating with a locking screw which is employed to secure the reflector in any desired position. Prior constructions include a disadvantage in this respect in that the locking screw for securing the reflector invariably occupies the position which should be occupied by the control button in order to make the same as convenient as possible for operation by the photographer employing the unit.

Such photoflash lamp units are often used in press photography wherein it is required that photographs be taken in rapid succession which in turn requires that the flash lamps be quickly inserted and removed from the unit. Flash lamps are ordinarily provided with a screw base and inasmuch as the time required for screwing and unscrewing these lamps is prohibitive, it has been the practice to employ spring type sockets permitting the lamps to merely be pushed into the socket or pulled out of the socket. These sockets usually comprise merely a cylindrical shell adapted to receive the base of the lamp, coiled tension springs being placed within the cylindrical shell in a position extending transversely of the sides of the lamp base so as to engage the grooves therein formed by the threads on the base. These spring type sockets are not satisfactory for the reason that the springs become bent and damaged and the socket soon loses its ability to satisfactorily hold a photoflash lamp in the proper positon and in a position establishing the required electrical contact with the contact members forming a part of the socket.

In connection with photoflash lamp photography it is often desirable to employ one or more additional photoflash lamps disposed at locations more or less remote from the camera location in order to obtain proper side lighting or highlighting of the scene being photographed. The present devices do not include any means which permits such extension lamps to be readily connected to the device so as to be fired simultaneously with the lamp which is held by the flash lamp unit. Furthermore, it is sometimes necessary that the camera be disposed in such a position as to make it impossible for a photographer to actuate the shutter and make the exposure. Under these conditions it is desirable that means be provided for connecting to the flash lamp unit an extension switch or control which permits the lamps to be fired and the exposure to be made by a photographer occupying a position remote from the camera position. Similarly, it is sometimes desirable to have the camera located remotely from the photoflash lamp unit and for this reason it is necessary that means be provided for extending an electrical connection between the unit and the shutter actuator which is mounted on a remotely located camera. None of these latter desirable features is to be found in any of the prior photoflash lamp unit constructions. Furthermore, the prior constructions, in addition to failing to provide the above noted desirable features, are usually costly to manufacture for the reason that the details of construction employed are such as to not be readily adapted to quantity production methods.

It is accordingly an object of my invention to provide as a photographic apparatus a photoflash lamp unit which is so constructed as to permit the ready and inexpensive manufacture thereof by quantity production methods, and which is also so constructed as not readily to get out of order.

It is also an object of my invention to provide an apparatus of the character set forth in the preceding paragraph which includes means permitting the ready attachment thereto of extension lamp units.

It is an additional object of my invention to provide an apparatus of the character set forth hereinbefore which includes means permitting the ready attachment thereto of a control extension between the unit and the shutter actuating device of a remotely located camera.

It is a still further object of my invention to provide an apparatus of the character set forth in the preceding paragraphs which includes means permitting the ready attachment thereto of an extension control device permitting the actuation of the unit from a remote point.

It is also an object of my invention to provide an apparatus of the character set forth hereinbefore wherein the reflector is adjustably mounted on the unit to permit the proper alignment between the reflector and various sizes of photoflash lamps used therewith.

It is an additional object of my invention to provide a device of the character set forth hereinbefore wherein the locking device for locking the reflector in its adjusted position is so constructed as not to interfere with the positioning of the control button in the location most convenient to a photographer employing the unit.

It is a still further object of my invention to provide a device of the character set forth hereinbefore wherein the locking device for holding the reflector in its adjusted position serves also as a guard disposed about the control button to prevent inadvertent actuation thereof.

It is an additional object of my invention to provide an apparatus of the character set forth hereinbefore which includes an improved spring socket construction.

Other objects and advantages of my invention will be apparent from a study of the following specifications, read in connection with the accompanying drawing, wherein.

Figure 1:
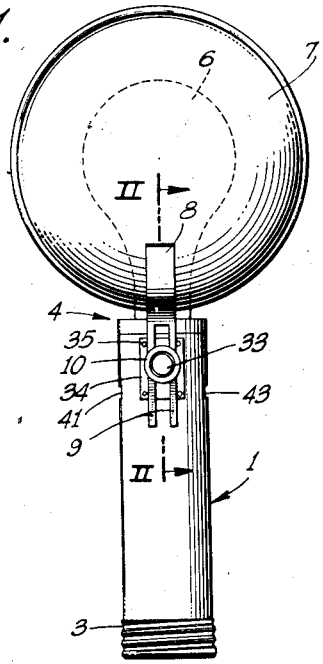
Fig. 1 is a rear elevational view of one form of photoflash lamp unit embodying certain novel features of construction of my invention.
Figure 2:
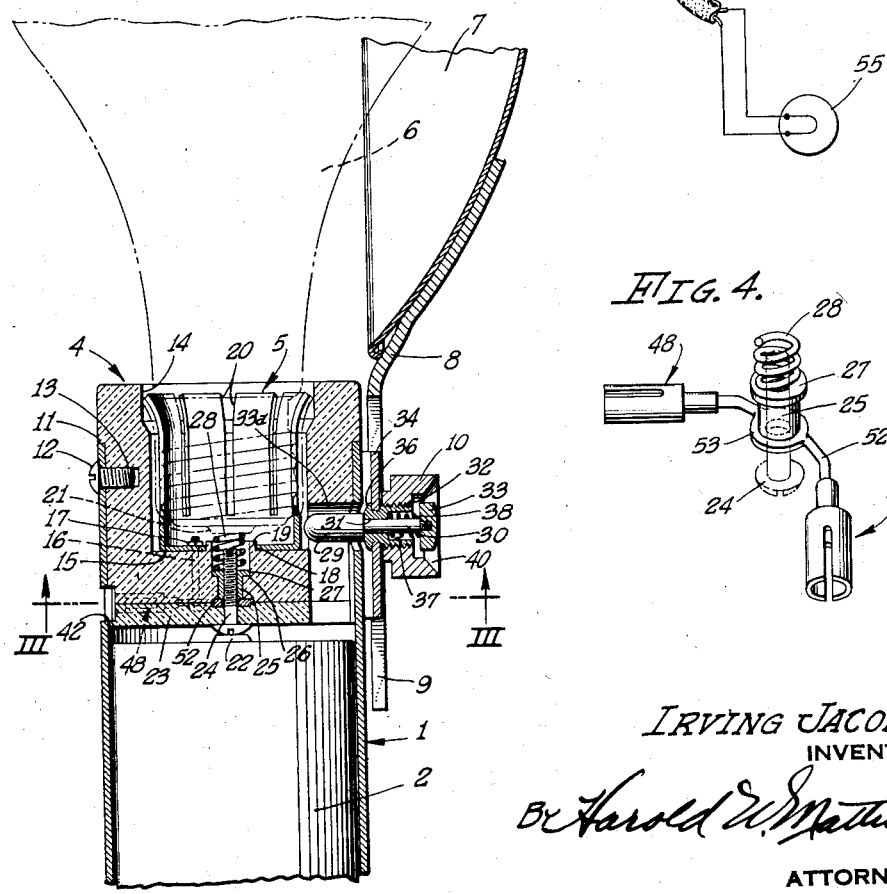
Fig. 2 is an enlarged fragmentary transverse vertical section taken substantially along the line II—II of Fig. 1 and illustrating the details of construction.

Referring to the drawing, I have illustrated in Figs. 1 and 2 the photoflash lamp unit of my invention as comprising a battery case 1 which is tubular in form permitting the reception therein of the desired number of dry batteries 2.

The lower end of the battery case 1 may be closed as by means of a screw closure member 3, which member is preferably fitted with a contact spring (not shown) adapted to engage the exposed case of the lowermost dry cell and establish a connection with the battery case 1 which is preferably constructed of an electrically conductive material. As is clearly shown in Fig. 2, the upper end of the battery case 1 is fitted with a socket unit 4 which includes a socket member 5 adapted to receive a photoflash lamp 6. A reflector 7 is preferably provided, the reflector having a downwardly depending supporting arm 8 which is bifurcated, as indicated at 9, to permit it to straddle a reflector locking or clamping nut 10 so that the reflector may be vertically adjusted and locked by means of the nut 10 in any such adjusted position. The case 1 is also preferably provided with an attachment clip (not shown) by means of which the case may be detachably secured to the casing of a camera with which the unit is to be used.

In order to permit the ready and inexpensive manufacture and assembly of the device of my invention I prefer to form the socket unit 4 of an insulating material of such character that it may be readily formed as by a molding process, Bakelite, or similar insulating thermo-plastic material being found eminently suitable for this purpose. The unit 4 is preferably formed cylindrical in shape having an outside diameter of such size as to permit it to be readily received within the upper end of the battery case 1. The socket unit 4 is preferably shouldered as indicated at 11 to provide a smooth, neat appearance of the junction between the unit 4 and the battery case 1. The socket unit 4 may be secured in place in the upper end of the battery case 1 as by means of a single attaching screw 12 passed through the upper end of the case 1 and threadedly engaged with a suitable threaded bore 13 provided in the side of the socket unit 4. The socket unit 4 is preferably also provided with a central recess 14 which is substantially cylindrical in shape and which extends axially downward from the top of the socket unit 4 for receiving the aforementioned socket member 5.

The socket member 5 which is inserted within the recess 14 is also cylindrical in shape and formed with a transversely extending bottom portion 15. The socket member 5 may be secured in the recess 14 as by providing attaching screws 16 which are passed upwardly from the bottom of the socket unit 4 through the base portion 15 of the socket member 5 and fitted with nuts 17 or otherwise engaged with the base portion 15. The base portion 15 is also preferably provided with a central opening 18 adapted to encircle a boss 19 which is raised from the bottom of the recess 14 and which serves as a guide in assembly operations to permit the accurate centering of the socket member 5 within the recess 14.

The socket member 5 is preferably split in a number of places as indicated at 20 and is preferably formed of a resilient material so as to permit the vertically extending leaves formed by the splits 20 to resiliently grip the base of the photoflash lamp 6 when it is inserted therein. The ease with which the flash lamp is inserted within the socket 5 may be increased by flaring the upper edge of the socket member 5 outwardly as indicated in Fig. 2, the upper portion of the recess 14 preferably also being relieved outwardly a radial distance preferably somewhat exceeding the thickness of the wall of the socket member 5, so as to allow a slight amount of clearance between the upper edge of the socket member 5 and the walls of the recess. This clearance is, however, made sufficiently small to permit the edge of the socket member 5 to be moved (by insertion of the base of the lamp 6 therein) into contact with the walls of the recess 14 and be prevented thereby from additionally moving outwardly and presenting an abutment for the extreme upper ends of the spring leaves 20 of the socket member 5. This causes each of the spring member portions of the socket member 5 to act as if they were held at both ends, thus materially increasing the rigidity of the spring and insuring a much firmer resilient grip upon the base of the lamp 6.

I have illustrated in Fig. 2 by solid lines the normal position of the socket member 5 when the lamp is removed therefrom and by dotted lines in this same figure the positions occupied by the socket member parts when the lamp 6 is inserted within the socket.

Figure 4:
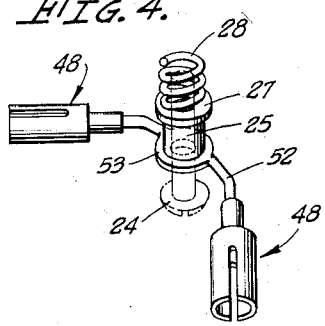
Fig. 4 is a perspective view illustrating the manner in which the central lamp terminal contact is constructed and assembled.

Suitable electrical connection between a center contact 21 of the flash lamp 6 and the center pole 22 of the uppermost dry cell 2 may be established by providing a center terminal which may be conveniently constructed along the lines illustrated in Figs. 2 and 4. This center terminal, in addition to providing the aforementioned necessary electrical connection, may also serve the purpose of securing to the socket unit 4 a lower cover member 23 therefor. The center terminal preferably comprises a screw 24 which is passed through a suitable bore provided in the cover member 23 and threadedly engaged with a sleeve 25 which is received in a suitable bore formed in the center of the socket unit 4 as a continuation of the recess 14. The bore within which the sleeve 25 is received is preferably shouldered as indicated at 26, and the sleeve 25 is provided with a similar radially extending flange 27 adapted to bear against the shoulder 26 and permit a tightening operation of the screw 24 to securely clamp the cover member 23 to the socket unit 4.

To the upper surface of the flange 27 I affix, as by soldering, brazing, or other suitable means, an upwardly extending coiled compression spring 28 which is adapted to extend into contact with the center lamp terminal 21 and provide the necessary electrical circuit extending from the spring through the sleeve 25 and the screw 24 to the center battery pole 22. The compression spring 28 is preferably formed of a material of such size as to provide an outside diameter substantially equal to the diameter of the bore within which the flange 27 is received and an inside diameter but slightly larger than the diameter of the screw 24 so that by extending the screw 24 upwardly beyond the plane of the flange 27 in the fashion indicated in Fig. 2, the screw 24 and the bore within which the flange 27 is received may serve as a guide to prevent the spring from bending sideways and to thus insure that the spring will at all times be compressed in a truly axial direction by insertion of the lamp 6.

In order to fire the photoflash lamp 6 it is necessary to complete an electrical connection between the socket member 5 and the battery case 1 which operation will connect the batteries 2 in series with the heater or igniter formed in the lamp 6. This connection may be established by means of a novel construction associated with the clamping nut 10, which construction is clearly illustrated in Figs. 2 and 3. This construction includes a contact member 29 which is mounted upon the end of a control button shaft 30, which shaft is mounted for slidable movement within a bore 31 formed in a threaded stud 32. A control button member or switch 33 may be affixed to the end of the shaft 30 as by a threaded connection between these members so that pressure on the button or switch 33 may serve to move the shaft 30 and the contact member 29 carried thereby inwardly and into contact with the socket member 5 to establish an electrical connection therewith, the contact member 29 being passed through a slot 33a extended longitudinally upward from the lower surface of the socket unit 4 to permit insertion and removal of the socket unit 4 from the upper end of the battery case 1 without interference with the contact member 29. In order that this electrical connection may also extend to the battery case 1, I mount the threaded stud 32 upon a clip member 34 which is in turn secured to the battery case 1 as by means of screws 35, the threaded stud 32 being secured to the clip member 34 as by riveting, such as indicated at 36 in Fig. 2.

It will be readily observed that pressure exerted on the button or switch 33 to move the contact member 29 into engagement with the socket member 5 will establish an electrical connection between the base of the photoflash lamp 6 and the battery case 1. It will also be observed that since the battery case 1 is electrically connected by means of the lower closure member 3 to one terminal of the batteries 2 and since the other terminal of the batteries 2 is connected by means of the screw 24 to the center contact 21 of the lamp 6, pressure on the control button 33 will complete the circuit to the lamp and effect the ignition of the same.

The contact member 29 is preferably normally held out of engagement with the socket member 5 and for this purpose I counterbore the threaded stud 32 as indicated at 37 and dispose within the recess so formed a compression spring 38 adapted to bear against the underside of the control button 33 so as to normally urge the contact member 29 out of engagement with the socket member 5.

The threaded stud 32 which serves as a guide for the control button or switch 33 may also be employed in connection with the clamping nut 10 as means for locking the reflector 7 in any desired adjusted position. For this purpose the clip 34 is preferably provided with a longitudinally extending boss 39 (Fig. 3) adapted to be received between the arms of the bifurcated reflector bracket 8 to serve as a guide for guiding vertical movement of the bracket relative to the stud 32. The locking or clamping nut 10 is threadedly engaged with the threaded stud 32 so as to permit rotary movement of the nut 10 to effect a clamping action of the bracket 8 against the flange portions of the clip 34 and lock the bracket in any desired position.

In order that the locking or clamping nut 10 may also serve as a guard about the button or switch 33 to prevent accidental firing of the flash lamp 6, the locking or clamping nut 10 is preferably recessed as indicated at 40 to provide an enclosure within which the control button or switch 33 is received. It will be observed that with this construction, the locking or clamping nut 10 is located in the position most convenient for operation in adjusting the position of the reflector 7 and that such positioning of the reflector adjustment means does not prevent the positioning of the control button or switch 33 in that location which is the most accessible to an operator employing the photoflash lamp unit.

As has been pointed out hereinbefore, it is desirable that provision be made for the use of extension devices with the above described photoflash lamp unit, and for this purpose I provide in the sides of the battery case 1 three rectangular openings 41, 42 and 43, these openings preferably being equally spaced relative to each other and relative to the clamping nut 10. These openings are preferably disposed in such location vertically as to lie in the horizontal plane of the junction between the lower cover 23 and the lower surface of the socket unit 4 and these two members are preferably flattened, as indicated at 44 in Fig. 3, so that they coact with the rectangular openings to provide for the reception and seating therein of extension cord cap members 45, 46 and 47.

With each of the seats thus formed is associated a pair of spring contact members 48 adapted to receive the legs 49 of the cord caps 45, 46 and 47, the upper surface of the cover 23 and the lower surface of the socket unit 4 being provided with suitable recesses for receiving and enclosing these members. The pair of contact members 48 which is associated with the opening 41 are preferably extended into connection, respectively, with the socket member 5 and the center terminal screw 24 so that actuation of the control button 33 will impress battery potential across these members as well as across the photoflash lamp 6. This connection may be established by extending a conductor 50 from one of the contact members 48 and into electrical connection with a washer 51 adapted to be clamped beneath the head of the aforementioned screw 16 which is used to secure the socket member 5 within the socket receiving recess 14. The connection of the other of the contact members 48 with the center terminal 24 may be effected as by extending an electrical conductor 52 into connection with a washer or ring member 53 which is adapted to be clamped between the sleeve 25 and the lower cover 23 or be secured to the sleeve 25 as by soldering or brazing thereto.

It will thus be observed that if an extension cord 54 be properly connected to the cord cap 45 and the cord cap 45 inserted within the recess 41 so as to establish an electrical connection between each of its prongs 49 and each of the spring contact members 48, a photoflash lamp 55 suitably connected to the other end of the extension cord 54 may be fired simultaneously with the photoflash lamp 6 by actuation of the control button 33. A precisely similar arrangement of parts is afforded as regards the spring contact members 48 associated with the opening 42 so that the cord cap 46 associated therewith may be attached to the end of another extension cord 56 and employed for firing a third photoflash lamp or employed, as illustrated diagrammatically in Fig. 3, for the actuation of an electrically operated device 57 for actuating the shutter of a camera 58.

As has been pointed out hereinbefore, it is sometimes desirable to permit actuation of the photoflash lamp unit from a remote location. This may be accomplished by attaching an extension cord 59 to the third cord cap 47 and affixing to the other end of the extension cord 59 a single pole momentary contact switch 60 such as that illustrated diagrammatically in Fig. 3. For this purpose one of the electrical contact members 48 which is associated with the opening 43 is extended into connection with the socket member 5 in the same fashion as that previously described in connection with the contact member associated with the opening 41. The other of the contact members 48 is electrically connected to the battery case 1 by providing an electrical conductor 61 which is extended into electrical connection with a spring member 62 adapted to bear against the inner surface of the battery case 1 when the socket unit 4 is inserted therein.

It will be observed that closing the switch 60 establishes an electrical connection between the socket member 5 and the casing 1 in the same fashion as does operation of the control device 33 so that the flash lamp 6 carried by the socket 5, a remotely located flash lamp 55, and the shutter actuating device 57 may thus be simultaneously energized by a photographer disposed at a location remote from the photoflash lamp unit of my invention.

Figure 3:
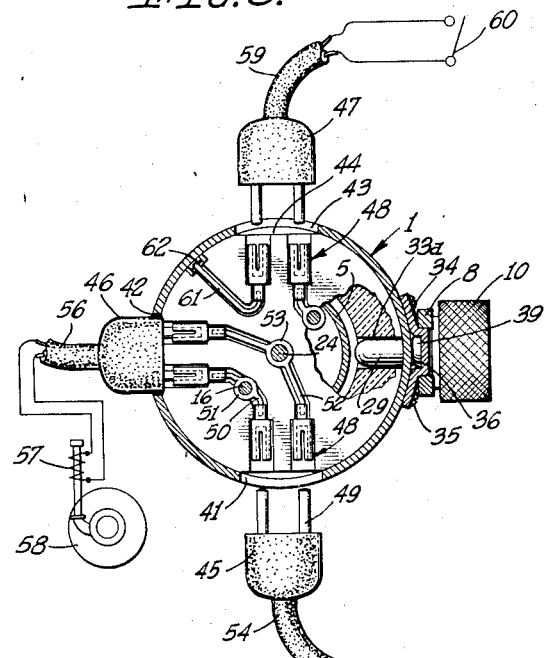
Fig. 3 is a horizontal sectional view taken substantially along the line III—III of Fig. 2 and illustrating diagrammatically the manner in which the extension facilities afforded by my unit may be employed.

Attention is called to the fact that with the construction which has been illustrated and described herein, the cord caps extend within the recess 42 in the fashion illustrated in Fig. 3 in connection with the cord cap 46 so as to completely cover all exposed electrical conductors to prevent accidental or inadvertent operation of the device and to prevent faulty operation resulting from dirt or other foreign materials coming into contact with the contact surfaces.

From the foregoing it will be observed that I have provided a photoflash lamp unit which is not only simple in construction, inexpensive to manufacture and not likely to get out of order, but which is also provided with means permitting the use of extension devices such as remotely situated photoflash lamps, remotely located controlling devices, and shutter actuators.

It will be further observed that the device of my invention includes a novel spring socket construction which permits the ready insertion and removal of photoflash lamps therein while affording a secure resilient grip with the base of such lamp.

Attention is also called to the fact that the device of my invention provides for the adjustable mounting of the reflector 7, the device which is used to lock the reflector in its adjusted position serving also as a guard about the control member which is used to fire the photoflash lamp, thus not only avoiding accidental operation of the device, but also permitting the location of the control button 33 in the position which is the most accessible to a photographer employing the device.

While I have shown and described the preferred embodiment of my invention, I do not desire to be limited to any of the details of construction shown or described herein, except as defined in the appended claims.

I claim:

1. In a lamp receiving socket for a photoflash lamp unit having a battery case; an insulating block in the upper end of the said battery case directly above and in axial alignment with the dry batteries when in position in said battery case, screw like means for securing said block in such position, said block carried by said case and having a longitudinally extending cylindrical recess formed therein; a center lamp contact disposed in the center of the bottom of said recess directly above the dry batteries when in position in said battery case; and a cylindrical socket shell disposed in said recess formed of resilient material and having a plurality of longitudinally extending narrow slots defining a plurality of leaf springs for engaging and holding the base of said lamp, each said spring being markedly outwardly flared at its upper terminal portion, the diameter of said recess at the upper ends of said springs being annularly enlarged to a radial extent at least equalling the thickness of each leaf spring of the socket shell, and to a longitudinal extent at least equaling the length of the flared terminal portion of said leaf springs, thus providing a radially enlarged annular abutment that is engaged by the extreme upper ends of said leaf springs when said lamp base is partially inserted in said shell, whereby the supporting of both ends of said springs adds to their stiffness to securely hold said lamp base in said socket.

2. In combination with a photoflash lamp unit including a case containing a battery, a lamp receiving socket on said case, and a lamp reflector carried by said case, a control switch and reflector support assembly including: a reflector bracket carried by said reflector and slidably secured to said case; a locking device for clamping said bracket to said case to hold said reflector against sliding movement, said locking device having a recess therein; and a control button actuatable to complete a circuit between said battery and said socket disposed in said recess, whereby said locking device serves also as a guard to protect against accidental actuation of said control button.

3. In combination with a photoflash lamp unit including a case containing a battery, a lamp receiving socket on said case, and a lamp reflector carried by said case, a control switch and reflector support assembly including: a reflector bracket carried by said reflector having a bifurcated end; a threaded stud having a longitudinally extending bore therethrough carried by said case and disposed between the arms of said bifurcated end; a locking nut threadedly engaged with said stud for locking said bracket to said case, said nut having a recess formed in the outer face thereof; a shaft slidably mounted in said bore; means responsive to sliding movement of said shaft to complete an electric circuit between said battery and said socket; and a button secured to said shaft and disposed in said recess to permit manual sliding of said shaft, whereby said locking nut serves also as a guard to prevent accidental sliding of said shaft.

4. In a photoflash lamp unit, the combination of: a case containing a battery; means electrically connecting one terminal of said battery to said case; a socket member including a socket shell and a center lamp contact; means for electrically connecting said shell to said case; a lower cover member disposed between said battery and said socket member; a pair of electrical receptacle members for receiving corresponding plug members connected to an extension circuit, said receptacle members being disposed between said socket member and said cover member and electrically connected to said center lamp contact and said shell respectively, said socket member and said cover member being recessed to receive said receptacle members; and a single securing means inter-engaging said cover member and said center lamp contact for securing said cover member to said socket member to retain said receptacle members in said recesses, said securing means being disposed in such position as to engage the other terminal of said battery.

5. In a photo-flash lamp unit having a case for receiving a battery, a lamp receiving socket comprising: a socket unit of insulating material having a cylindrical recess or chamber provided with a flat bottom and a central opening therethrough, a shell-like socket member of resilient material received in said recess or chamber and consisting of a flat bottom received upon and secured to the flat bottom of said recess or chamber and a substantially cylindrical body for receiving a lamp bulb, the said flat bottom of said shell-like member having a substantially central opening, a lower cover member also of insulating material and positioned flatwise against the bottom of said socket unit and having a substantially central opening, a center terminal screw 24 extending through both of said openings and having a headed lower end, a sleeve 25 surrounding said screw 24 and having a threaded engagement therewith and also having an outer formation engaging the wall in the bottom of the socket unit, thereby permitting a tightening operation of the screw 24 so as to clamp the cover member to the said socket unit, and means supported by the upper end of said screw to provide electrical connections to the battery.

6. In combination with a photo-flash lamp unit including a case containing a battery having one terminal connected to said case and a socket having a center lamp contact connected to the other terminal of said battery, said socket having an outer insulating unit with a cylindrical recess or chamber and an inner socket shell of resilient material received in said recess or chamber, and a switch for firing the said lamp comprising a slidable contact member 29 having in and out radial movement in the wall of the said insulating socket unit, a control button shaft 30 carrying said contact member 29, a threaded stud 32 having a bore receiving said shaft 30 and a support for said threaded stud, the wall of the insulating socket unit having a radial recess for said contact member.

7. In combination with a photo-flash lamp unit including a case containing a battery having one terminal connected to said case and a socket having a center lamp contact connected to the other terminal of said battery, said socket having an outer insulating unit with a cylindrical recess or chamber and an inner socket shell of resilient material received in said recess or chamber, and a switch for firing the said lamp comprising a slidable contact member 29 having in and out radial movement in the wall of the said insulating socket unit, a control shaft 30 carrying said contact member 29, a threaded stud having a bore receiving said shaft 30, and a spring 38 tending normally to urge the contact member 29 out of engagement with the said socket shell, the said insulating socket unit being radially slotted at 33a for the said slidable contact member, said slot 33a extending lengthwise through the base of said socket unit so as to permit lengthwise removal of the said socket unit without disturbing said contact member.

IRVING JACOBSON.